Dec. 20, 1927.
J. ABRACHINSKY
STORE FIXTURE
Filed Feb. 25, 1927
1,653,530
2 Sheets-Sheet 1
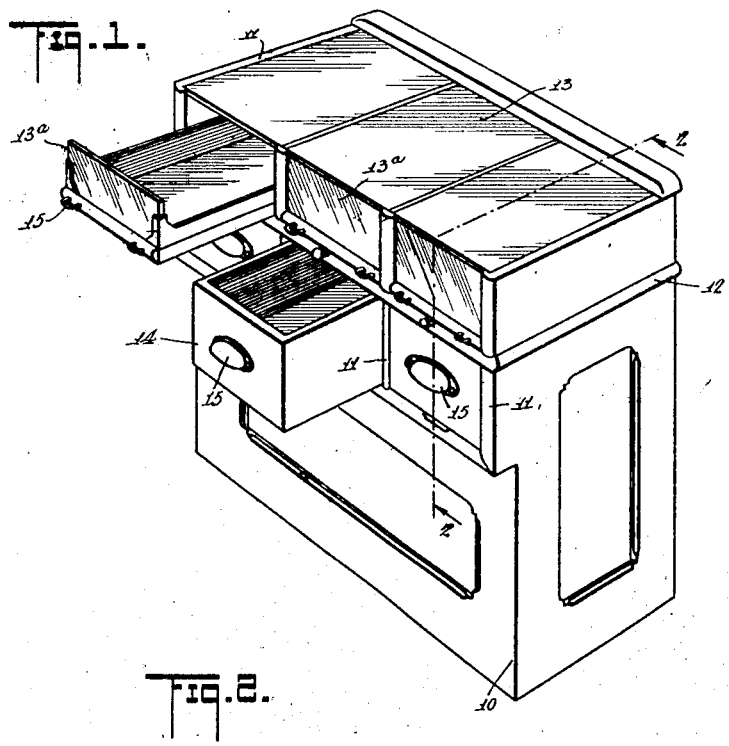
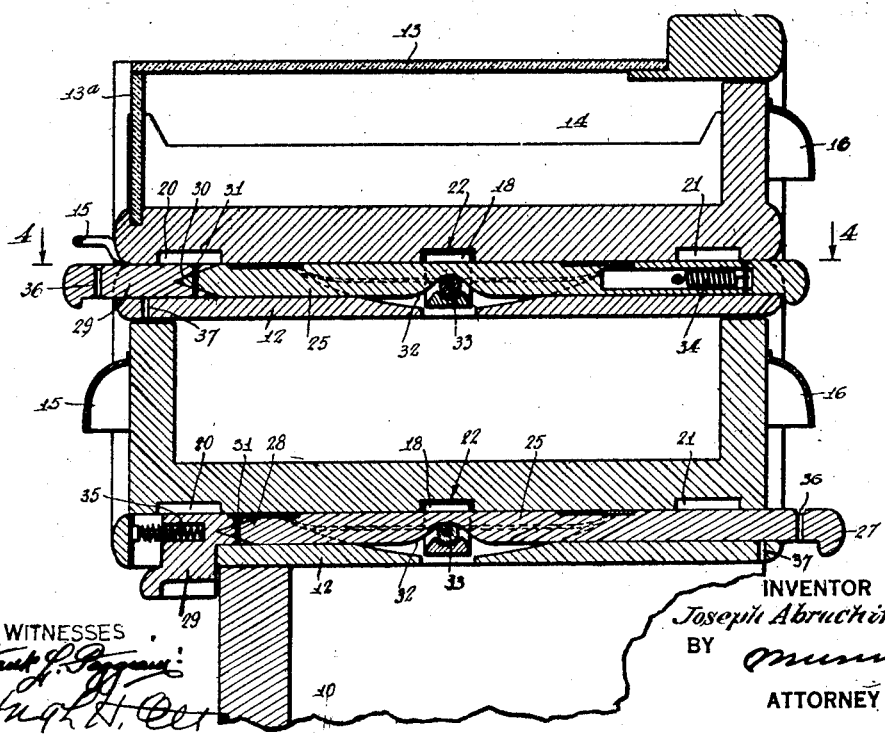
WITNESSES
INVENTOR
Joseph Abrachinsky.
BY
ATTORNEY Dec. 20, 1927.
J. ABRACHINSKY
1,653,530
STORE FIXTURE
Filed Feb. 25, 1927
2 Sheets-Sheet 2
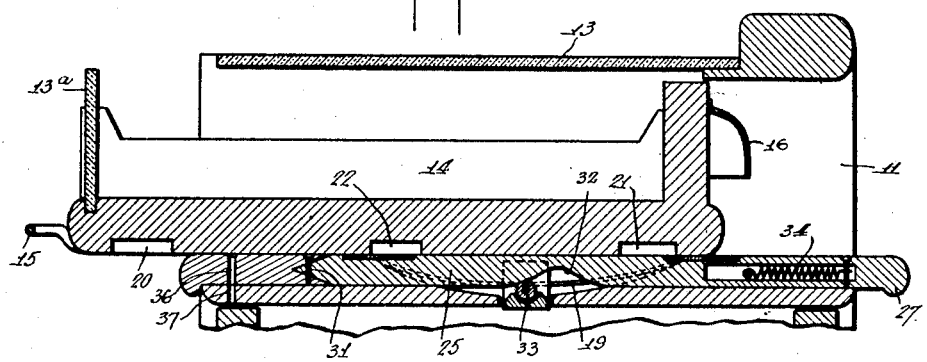
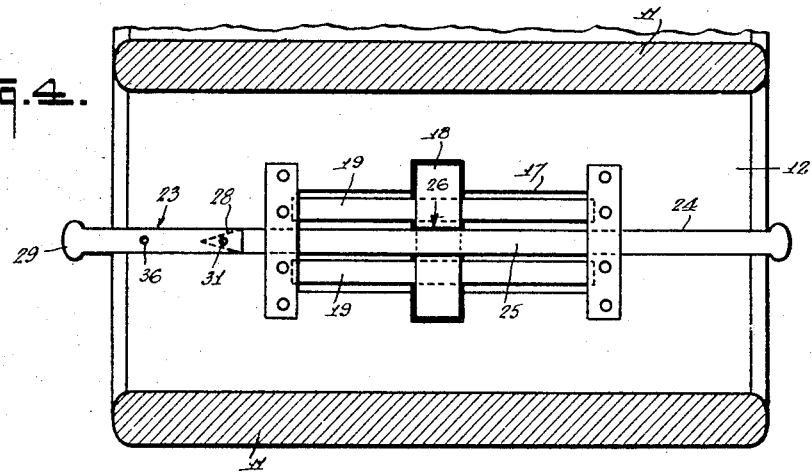
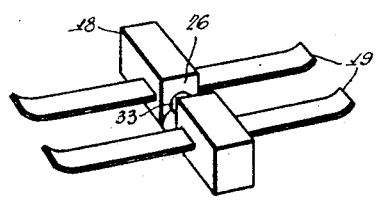
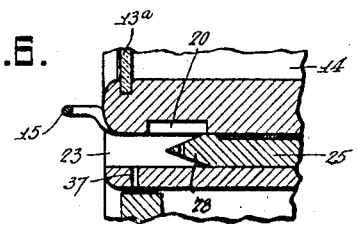
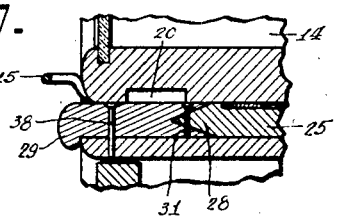
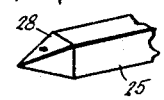
WITNESSES
INVENTOR
Joseph Abrachinsky.
BY
ATTORNEY Patented Dec. 20, 1927.

1,653,530

UNITED STATES PATENT OFFICE.

JOSEPH ABRACHINSKY, OF SHENANDOAH, PENNSYLVANIA.

STORE FIXTURE.

Application filed February 25, 1927. Serial No. 170,880.

This invention relates to store fixtures and has particular reference to an improvement in counter and show-case constructions.

One of the principal objects of the present invention is to provide a fixture in the nature of a counter having one or more drawers mounted to slide in opposite directions through said counter to an open position, whereby the contents may be observed and removed from the drawer either from the front or rear of the counter.

The invention furthermore comprehends a means for locking the drawer in a neutral closed position or in partially opened positions, and means for releasing the locking means from either side of the counter.

As a further object the invention contemplates means for rendering the locking means inactive or means for rendering inactive the releasing means on one side of the counter.

As a further object the invention contemplates a counter having a transparent top panel and a drawer mounted to slide in opposite directions through the counter to an open position, in which the drawer is provided with a transparent front panel, combining with the transparent top panel to constitute a show-case so that goods, wares or merchandise displayed in the show-case may be removed from either the front or the rear of the show-case by the purchaser or salesman.

Other objects reside in the simplicity of construction, the economy with which the same may be produced, and the general efficiency and convenience derived therefrom.

With the above recited and other objects in view, reference is had to the following specification and accompanying drawings, in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1 is a perspective view of a counter constructed in accordance with the invention illustrating certain of the drawers in open condition;

Fig. 2 is a vertical sectional view therethrough taken approximately on the line 2—2 of Fig. 1, illustrating the drawers in locked condition;

Fig. 3 is a similar sectional view illustrating the locking means released;

Fig. 4 is a horizontal sectional plan view taken approximately on the line 4—4 of Fig. 2;

Fig. 5 is a perspective view of one of the locking elements removed;

Fig. 6 is a fragmentary sectional view illustrating the manner in which the releasing means on one side of the counter is rendered inactive;

Fig. 7 is a similar view illustrating the manner of rendering the locking means inactive;

Fig. 8 is a fragmentary perspective view of one of the ends of the releasing bar with the manipulating element removed therefrom.

Referring to the drawings by characters of reference, 10 designates a counter having spaced vertical partitions 11 and spaced horizontal partitions 12 and 13, which combine to define drawer compartments extending through the counter from front to rear. The drawers 14 are arranged in their compartments to slide through the counter in opposite directions to an open position and are provided with handles 15 and 16 on the front and rear walls for sliding the same. Mounted in recesses 17 in the bottom walls of the compartments, such as the partitions 12, is a locking means preferably in the nature of a detent 18, which is normally projected upwardly by any suitable means, such as leaf springs 19. The under side or bottom of the drawer is provided with keeper openings or recesses 20, 21 and 22, located respectively adjacent the forward and rear ends, and intermediate thereof the bottom walls of the compartments are further provided with medial longitudinally extending recesses 23 and 24, which communicate with the recesses 17 at their inner ends and extend completely therefrom through the outer ends of the bottom walls of the compartments. A slide bar 25 is arranged in the recesses 23 and 24 and extends through the central recess 17 and through a slot 26 formed in the detent 18. The slide bar is formed at its rear end with a manipulating head or handle 27 and is formed at its forward end with a pyramidal terminal 28. A manipulating section 29 having a complementary pyramidal shaped socket 30 is fitted over the terminal 28, and the inner end of the member 29 and the terminal 28 are provided with registering openings through which a pin 31 is engaged for detachably connecting the manipulating member 29 to the slide bar 25. The under side of the slide bar is formed with a cutaway cam portion 32 while the slotted portion 26 of the detent has mounted therein a roller 33. Suitable means is provided, such as a coiled contractile spring 34, in the upper slide bar in Fig. 2, or a coiled compression spring 35, as illustrated in connection with the lower slide bar in Fig. 2, for normally moving the slide bar to a position where the cutaway cam portion 32 registers with the detent roller 33. This normally allows the springs 19 to move the detent 18 upwardly into engagement in one of the keeper openings or recesses 20, 21 or 22. It is obvious that when the detent is engaged in the intermediate keeper opening 22, the drawer is locked in a neutral closed position, and that when the detent is engaged in either the front or rear keeper opening or recess 20 or 21, the drawer is locked in a partially opened position either at the front or rear of the counter. The slide bar 25 at the upper part of Fig. 2 is slidable rearwardly to cause the cutaway cam portion 32 to depress and release the detent, while the slide bar 25 illustrated at the lower part of Fig. 2 is slidable forwardly for this purpose.

In event it is desired to position and maintain the locking means inactive, the slide bars are formed with vertical openings 36 and the bottom walls or partitions 12 with vertical openings 37, which openings are brought into alinement when the bars are moved to a position to hold the detent retracted or depressed and through which a pin 38 is inserted.

When it is desired to prevent manipulation of the slide bar from one side of the counter, namely, the front side, while allowing the same to be released from the rear side, the pins 31 are withdrawn and the manipulating members 29 removed. The pyramidal form of the extremities 28 of the slide bars prevents the insertion of a pointed instrument through the recess 23 for the purpose of manipulating the slide bar.

In some instances the uppermost horizontal partition 13, as illustrated, will be of glass or a transparent panel while the front wall 13a of the upper drawers 14 will be of glass or a transparent material, to constitute a show-case, whereby the goods, wares or merchandise therein are displayed to the purchasers. It thus follows that a sales clerk standing behind the counter may release and slide the drawers 14 forwardly to allow the purchaser to remove and examine the contents of the drawer.

What is claimed is:

1. A store fixture including a counter, a drawer mounted to slide in opposite directions through said counter to open positions, means for locking the drawer in neutral closed position, means for releasing said locking means from either side of the counter, and means for rendering said locking means inactive.

2. A store fixture including a counter, a drawer mounted to slide in opposite directions through said counter to open positions, means for locking the drawer in neutral closed position, means for releasing said locking means from either side of the counter, and means for rendering inactive the releasing means on one side of the counter.

3. A store fixture comprising a counter, a drawer mounted to slide in opposite directions through said counter to open positions, means for locking the drawer respectively in a neutral closed position and in partially open positions, projecting from either side of the counter, and means for releasing said locking means from either side of the counter.

4. In a counter for stores, a drawer mounted to slide in opposite directions through said counter to open positions, said drawer having keeper recesses on the under side adjacent the opposite ends and intermediate thereof, a spring-pressed detent mounted in the counter beneath the drawer, means normally projecting the detent upwardly to engage within the keeper recesses, a slide bar longitudinally slidable with respect to the drawer, having a cam portion coacting with the detent, and means for normally projecting the slide bar to a position to permit locking engagement of the detent with one of the keeper recesses, the said slide bar having manipulating portions projecting respectively beyond the front and rear of the counter for sliding the slide bar to a position to cause the cam portion to retract the detent downwardly to release and permit of sliding of the drawer.

5. In a counter for stores, a drawer mounted to slide in opposite direction through said counter to open positions, said drawer having keeper recesses on the under side adjacent the opposite ends and intermediate thereof, a spring-pressed detent mounted in the counter beneath the drawer, means normally projecting the detent upwardly to engage within the keeper recesses, a slide bar longitudinally slidable with respect to the drawer, having a cam portion coacting with the detent, and means for normally projecting the slide bar to a position to permit locking engagement of the detent with one of the keeper recesses, the said slide bar having manipulating portions projecting respectively beyond the front and rear of the counter for sliding the slide bar to a position to cause the cam portion to retract the detent downwardly to release and permit of sliding of the drawer, the said slide bar having a detachable terminal section adapted when detached to prevent manipulation of the slide bar from one side of the counter.

6. In a counter for stores, a drawer mounted to slide in opposite directions through said counter to open positions, said drawer having keeper recesses on the under side adjacent the opposite ends and intermediate thereof, a spring-pressed detent mounted in the counter beneath the drawer, means normally projecting the detent upwardly to engage within the keeper recesses, a slide bar longitudinally slidable with respect to the drawer, having a cam portion coacting with the detent, and means for normally projecting the slide bar to a position to permit locking engagement of the detent with one of the keeper recesses, the said slide bar having manipulating portions projecting respectively beyond the front and rear of the counter for sliding the slide bar to a position to cause the cam portion to retract the detent downwardly to release and permit of sliding of the drawer, the said slide bar having a detachable terminal section adapted when detached to prevent manipulation of the slide bar from one side of the counter, the said slide bar and counter having pin-receiving openings adapted to register when the slide bar is in a position to retract the detent, and a pin insertable therein for holding the slide bar in said position.

JOSEPH ABRACHINSKY.